(12) United States Patent  
Lee

(10) Patent No.: US 7,686,036 B1  
(45) Date of Patent: Mar. 30, 2010

(54) VALVE APPARATUS FOR MOVABLE OXYGEN CYLINDER

(75) Inventor: Kwang Ho Lee, Busan (KR)

(73) Assignee: Youngdo Ind. Co., Ltd., Busan (KR)

( * ) Notice: Subject to any disclaimer, the term of this patent is extended or adjusted under 35 U.S.C. 154(b) by 0 days.

(21) Appl. No.: 12/385,337

(22) Filed: Apr. 6, 2009

(30) Foreign Application Priority Data

Oct. 13, 2008   (KR) .................... 10-2008-0100151

(51) Int. Cl.  
*F15B 13/04* (2006.01)

(52) U.S. Cl. .................................. 137/596.2; 137/102

(58) Field of Classification Search ................ 137/102, 137/596, 596.2, 881; 128/205.24  
See application file for complete search history.

(56) References Cited

U.S. PATENT DOCUMENTS

| | | | | |
|---|---|---|---|---|
| 1,728,476 | A * | 9/1929 | Cone | 137/596 |
| 2,376,348 | A * | 5/1945 | Fox | 137/102 |
| 2,524,052 | A * | 10/1950 | Grant, Jr. | 137/596 |
| 2,535,844 | A * | 12/1950 | Emerson | 137/102 |
| 3,026,908 | A * | 3/1962 | Blair | 137/596.2 |
| 4,008,716 | A * | 2/1977 | Amlong | 137/614.19 |
| 4,037,595 | A * | 7/1977 | Elam | 137/102 |
| 4,372,343 | A * | 2/1983 | Trinkwalder, Jr. | 137/614.2 |
| 5,407,096 | A * | 4/1995 | Smith | 137/881 |
| 5,566,713 | A | 10/1996 | Lhomer et al. | |
| 6,148,841 | A * | 11/2000 | Davidson | 137/886 |
| 6,386,235 | B1 * | 5/2002 | McCulloh et al. | 137/881 |
| 2003/0217774 | A1 * | 11/2003 | Markham et al. | 137/613 |

FOREIGN PATENT DOCUMENTS

| | | |
|---|---|---|
| KR | 1020020039315 | 5/2002 |
| WO | WO01/02761 | 1/2001 |

OTHER PUBLICATIONS

KR2002-0039315, Eusebi,Gilberto, Valve for High Pressure Gas Cylinders, May 25, 2002, Machine Translation.*

* cited by examiner

*Primary Examiner*—John Rivell  
*Assistant Examiner*—Craig Price  
(74) *Attorney, Agent, or Firm*—Rosenberg, Klein & Lee

(57) ABSTRACT

The valve apparatus includes: a valve body whose one side is combined with the movable oxygen cylinder, which communicates with a discharge port at the other side thereof along a path from one side thereof lengthily therein, to thus discharge out the oxygen of the oxygen cylinder through the discharge port. An opening which opens outwards from an insertion space provided along the path, and a post valve which is installed at the other side of the valve body and controls discharge of oxygen through the discharge port from the oxygen cylinder according to operation of a lever. A charge adapter whose one side is detachably installed in the opening of the insertion space, which charges oxygen supplied from the outside into the oxygen cylinder when the post valve closes the path, and discharges oxygen of the oxygen cylinder through the discharge port when the post valve opens the path.

11 Claims, 4 Drawing Sheets

VALVE APPARATUS FOR MOVABLE OXYGEN CYLINDER

CROSS-REFERENCE TO RELATED APPLICATION

This application claims the benefit of Korean Patent Application No. 10-2008-0100151, filed on Oct. 13, 2008, in the Korean Intellectual Property Office, the disclosure of which is incorporated herein by reference.

BACKGROUND OF THE INVENTION

1. Field of the Invention

The present invention relates to a valve apparatus, an more particularly, to a valve apparatus which is installed in a movable oxygen cylinder so as to be used as a post valve for an oxygen generation system for household use or a post valve for general medical care.

2. Description of the Related Art

According to a lot of standards established by the Compressed Gas Association (CGA), a post valve for medical care which is combined with an ambulatory oxygen cylinder adopts a particularly different valve, gas line, connector considering the kind of gas which is used therein. For example, outlet connect fittings for a gas cylinder are designated according to CGA-870 regarding the gas cylinder in which 93% oxygen has been charged and CGA-950 regarding the gas cylinder in which the gas for medical care has been charged, respectively. As these standards are designated as size of fittings that are incompatible with one another, the fittings are prevented from improperly crossing and being connected with each other.

In this case, a CGA-870 post valve includes a CGA-870 port in order to supply oxygen discharged from an oxygen cylinder to a patient. According to regulation of the American Food and Drug Administration (FDA), an oxygen generation apparatus for household use is made to prevent it from being connected with the CGA-870 port in order to charge oxygen. Accordingly, a valve which has a separate single charge port in a cylinder has been used in order to charge oxygen.

By the way, a general valve in which a regulator has not been built is not been fitted with the CGA-870 port in the case of the single charge port valve, and thus includes a special regulator. The valve in which the special regulator has been built is expensive. As well, since width of selection of an apparatus which a user (or a patient) can install in an oxygen cylinder is greatly reduced, use of a valve having a single charge port decreases rapidly.

A valve which includes a CGA-870 port together with a charge port through which oxygen can be charged is disclosed in U.S. Pat. No. 6,386,235, in order to solve these problems.

By the way, if a check valve which is installed in the inside of a valve body in the case of the conventional valves, the entire valve should be separated from the cylinder and then the check valve should be maintained, repaired and replaced. As a result, a troublesome work may be caused. Also, if foreign matters are included in oxygen discharged through the CGA-870 port, a conventional valve filters out the foreign matters through a filter in a regulator connected with the CGA-870 port, but there is a limit to raise cleanliness of oxygen.

Moreover, the conventional valve can be used only for a post valve for an oxygen generation system for household use, but cannot be used for a post valve for a general medical care. Accordingly, when an oxygen cylinder is used for medical care, there is a problem that an additional post valve for general medical care should be provided for a prospective customer.

SUMMARY OF THE INVENTION

To overcome inconveniences of the conventional art, it is an object of the present invention to provide a valve apparatus for a movable oxygen cylinder, which can do a function of a post valve for an oxygen generation system for household use and a post valve for general medical care at the same time.

It is another object of the present invention to provide a valve apparatus for a movable oxygen cylinder, which possesses a check valve in a charge adapter so as to satisfy a FDA regulation which requires that an oxygen generation apparatus for household use is installed in a CGA-870 port to thus prevent oxygen from being charged into an oxygen cylinder, in the case that the valve apparatus is used for a post valve for an oxygen generation system for household use.

It is still another object of the present invention to provide a valve apparatus for a movable oxygen cylinder, which can supply oxygen discharged from a cylinder for a patient at the state where high cleanliness is maintained.

It is yet another object of the present invention to provide a valve apparatus for a movable oxygen cylinder, which can maintain and repair a check valve easily and quickly, in the case that the check valve is out of order.

To accomplish the above object of the present invention, according to an aspect of the present invention, there is provided a valve apparatus for a movable oxygen cylinder, the valve apparatus comprising:

a valve body whose one side is combined with the movable oxygen cylinder, and which comprises an opening which communicates with a discharge port at the other side therein along a first path, an insertion space, and a second path, in sequence lengthily from one side, to thus discharge oxygen discharged from the oxygen cylinder through the discharge port, and which is opened outside from the insertion space provided between the first path and the second path;

a post valve which is installed at the other side of the valve body, and which opens and closes the upper end of the second path which communicates from the oxygen cylinder to the discharge port according to operation of a lever, to thus control discharge of oxygen; and a charge adapter whose one side is detachably installed in the opening of the insertion space, and which comprises a third path which is formed lengthily and a fourth path whose one side communicates with the third path and other side communicates with the first path and the insertion space, and a first check valve which charges oxygen supplied from the outside into the oxygen cylinder along the third path, the fourth path and the first path, in the case that the check valve is installed along the third path and thus closes the second path, and a second check valve which discharges oxygen supplied from the oxygen cylinder into the discharge port along the first path, the fourth path, the insertion space and the second path, in the case that the check valve is installed along the fourth path and thus opens the second path, wherein the first check valve interrupts oxygen discharged from the oxygen cylinder from reversely flowing in the charging direction of the charge adapter, and the second check valve interrupts oxygen from being charged into the oxygen cylinder through the discharge port.

Preferably but not necessarily, the charge adapter comprises:

an adapter body whose rear end is detachably combined with the entrance of the insertion space of the valve body, and with the front end of which an oxygen generation apparatus is selectively combined, and which has a hollow portion which communicates with an oxygen influx hole lengthily therein;

the first check valve which is installed in the hollow portion of the adapter body, in which a first communication hole which communicates with the oxygen influx hole is provided in the third path, and which makes the first communication hole opened, and interrupts the oxygen discharged from the oxygen cylinder from reversely flowing in the charging direction of the charge adapter, when the oxygen supplied from the outside is charged into the oxygen cylinder;

a check plug whose one side is combined with the hollow portion of the adapter body, in which a second communication hole is provided in the fourth path which communicates with the third path, and which has at least one third communication hole which communicates with the first path from the fourth path and at least one fourth communication hole which communicates with the second path through the insertion space from the fourth path; and the second check valve which is installed in the fourth path of the check plug, and which makes the second communication hole opened, and interrupts the oxygen from being charged into the oxygen cylinder through the discharge port of the valve body, when the oxygen of the oxygen cylinder is discharged through the discharge port.

Preferably but not necessarily, the valve apparatus further comprises a filter which is installed in the fourth path, and which filters impurities included in the oxygen which is guided into the second path of the valve body through the second communication hole from the oxygen cylinder.

Preferably but not necessarily, the valve apparatus further comprises a pre-filter for filtering the impurities which flow into the first communication hole through the oxygen influx hole when the oxygen is charged.

Preferably but not necessarily, the first check valve comprises:

a check valve guide unit which is installed in the hollow portion of the adapter body, in which first and second grooves which communicate with each other through the first communication hole are formed in the inner circumferential portion of the third path which communicates with the oxygen influx hole;

a stopper which is installed adjacently at the rear end of the check valve guide unit which is installed in the hollow portion of the adapter body, and which has a guide hole which is disposed concentrically with the center of the first communication hole of the check valve guide unit therein; and an actuator in which a valve head, a flange unit, a body unit and a guide rod are integrally formed in sequence, and which is installed elastically in the first groove, and in which the valve head selectively contacts the first communication hole and the guide rod is slid along the guide hole of the stopper, so as to make the first communication hole opened and to interrupt the oxygen discharged from the oxygen cylinder from reversely flowing in the charging direction of the charge adapter, when oxygen is charged into the oxygen cylinder.

Preferably but not necessarily, the second check valve is formed of a spherical ball which is elastically installed so as to selectively open and close the second communication hole which is provided in the fourth path of the check plug according to whether or not oxygen is discharged.

Preferably but not necessarily, the valve apparatus performs to charge oxygen into the oxygen cylinder through the discharge port, in the case that a closing bolt closing the opening of the insertion space is engaged instead of the charge adapter.

Preferably but not necessarily, the discharge port is a CGA-870 port which supplies oxygen for a patient.

Preferably but not necessarily, the first check valve has one input and one output and the second check valve has two inputs and one input.

According to another aspect of the present invention, there is provided a valve apparatus for a movable oxygen cylinder, the valve apparatus comprising:

a valve body whose one end is detachably combined with the movable oxygen cylinder, and which comprises a first path which is formed lengthily therein and whose one side communicates with the oxygen cylinder, a second path which is formed lengthily therein and whose one side communicates with a discharge port, and an insertion space whose one side communicates with an opening which is opened outside and whose other side communicates with the other sides of the first and second paths, respectively;

a post valve which is installed at the other end of the valve body, and which opens and closes the upper end of the second path which communicates from the oxygen cylinder to the discharge port according to operation of a lever, to thus control discharge of oxygen; and a charge adapter whose one side is detachably installed in the opening of the insertion space, and which comprises a first check valve which charges oxygen supplied from the outside into the oxygen cylinder in the case that the post valve closes the second path and a second check valve which discharges oxygen supplied from the oxygen cylinder into the discharge port in the case that the post valve opens the second path, wherein the first check valve interrupts oxygen discharged from the oxygen cylinder from reversely flowing in the charging direction of the charge adapter, and the second check valve interrupts oxygen from being charged into the oxygen cylinder through the discharge port.

Preferably but not necessarily, the charge adapter comprises:

an adapter body whose rear end is detachably combined with the entrance of the insertion space of the valve body, and with the front end of which an oxygen generation apparatus is selectively combined, and which has a third path which communicates with an oxygen influx hole lengthily therein;

the first check valve which is installed in the third path inside the adapter body, and which makes the third communication hole opened, and interrupts the oxygen discharged from the oxygen cylinder from reversely flowing in the charging direction of the charge adapter, when the oxygen supplied from the outside is charged into the oxygen cylinder;

a check plug which is installed at the rear end of the first check valve inside the adapter body, and which has a fourth path whose one side communicates with the third path and whose other side communicates with the first path and the insertion space therein; and the second check valve which is installed in the fourth path of the check plug, and which makes the fourth path opened, and interrupts the oxygen from being charged into the oxygen cylinder through the discharge port, when the oxygen of the oxygen cylinder is discharged through the discharge port.

Preferably but not necessarily, the first and second paths are disposed on a respectively different axial line, in which the first path mutually communicates with the second path through the fourth path: the second check valves and insertion spaces installed in the check plug.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
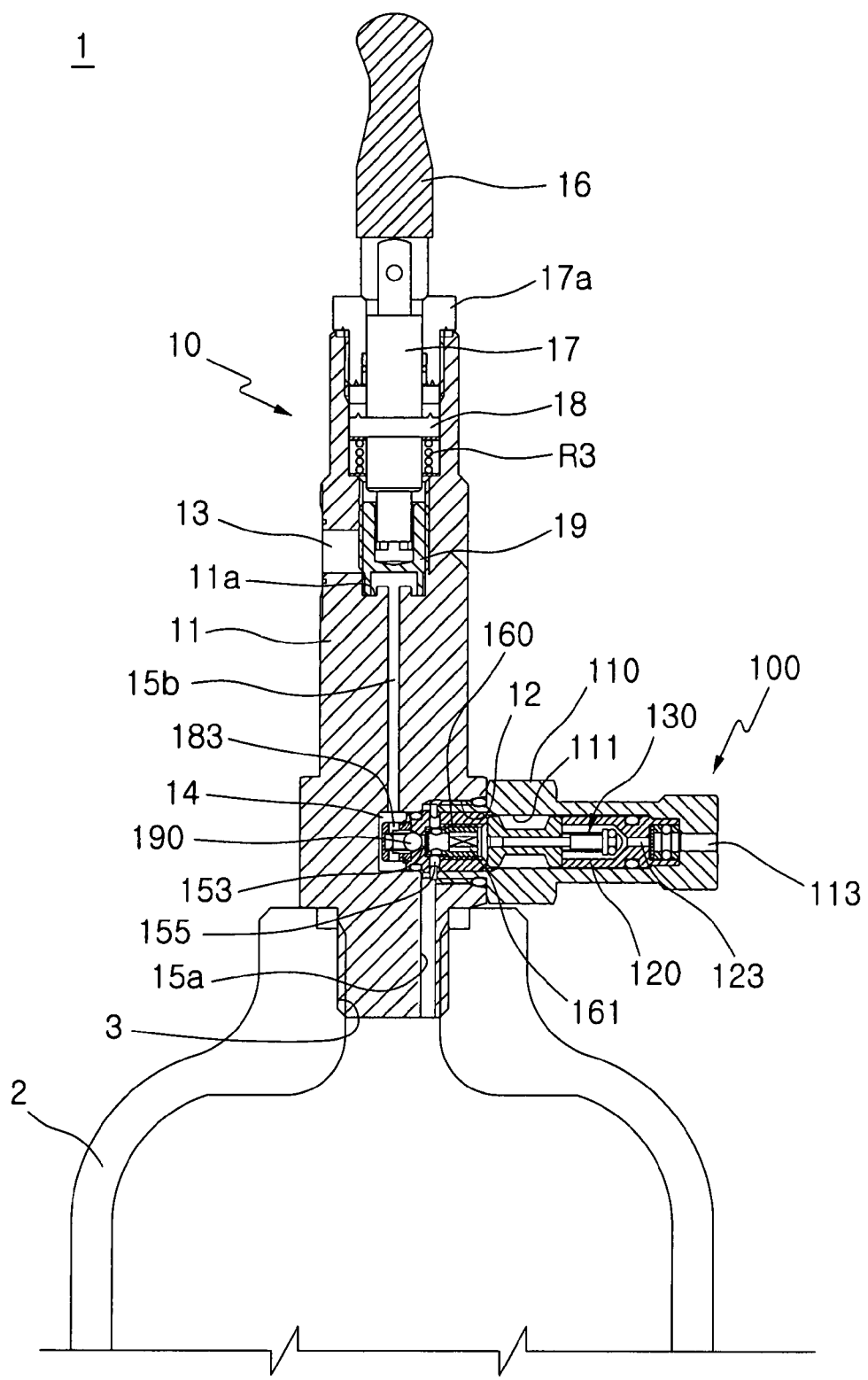
FIG. 1 is a cross-sectional view showing to a valve apparatus including a charge adapter according to an embodiment of the present invention.

Hereinbelow, a valve apparatus according to an embodiment of the present invention will be described with reference to the accompanying drawings. Like reference numerals are assigned for like elements in the drawings.

Referring to FIG. 1, a valve apparatus 1 according to an embodiment of the present invention includes a post valve 10 and a charge adapter 100, largely.

The post valve 10 includes a valve body 11, a lever 16, a piston rod 17 and a piston 18, a valve stem 19 and a return spring R3, and opens and closes a CGA-870 port 13 according to selection of the lever 16.

The lower end of a valve body 11 is detachably screw-connected with an injection hole 3 of a cylinder 2. A CGA-870 port 13 is formed at one side of the valve body 11, in order to supply oxygen for a patient. In addition, first and second paths 15a and 15b are formed in the valve body 11, along the lengthy direction of the valve body 11 from the lower end of the valve body 11 in order to guide oxygen flown in a cylinder 2 into the CGA-870 port 13. The first path 15a communicates with an insertion space 14 where a second check valve 190 of the charge adapter 100 is inserted from the lower end of the valve body 11, and the second path 15b communicates with the insertion space 14 to a valve seat unit 11a adjacent to the CGA-870 port 13. In this case, the respective centers of the first and second paths 15a and 15b are not positioned on the concentric axis, but disposed out of line. The reason why the first and second paths 15a and 15b are not positioned on the concentric axis is to guide oxygen discharged from the cylinder 2 and guided along the first path 15a into the second path 15b through the second check valve 190 to be described later.

A lever 16 is protrudingly installed at the upper end of the valve body 11, and is hinge-combined with a piston rod 17 that is slidably installed along the inside of a piston rod support 17a screw-connected with the upper end of the valve body 11. In this case, a piston 18 is formed on the outer circumference of the piston rod 17 and the piston 18 is elastically supported by a return spring R3. The piston rod support 17a prevents the piston rod 17 and the piston 18 from seceding from each other.

Accordingly, if a user bends the lever 16 at right angles about the valve body 11, the piston rod 17 rises up by the return spring R3 and the upper end of the second path 15b of the closed state is opened by the valve stem 19.

The valve stem 19 is installed at the lower end of the piston rod 17, and is actuated along the valve body 11 together with the piston rod 17 according to operation of the lever 16, to thus open and close the upper end of the second path 15b that is adjacent to the CGA-870 ports 13.

Figure 2:
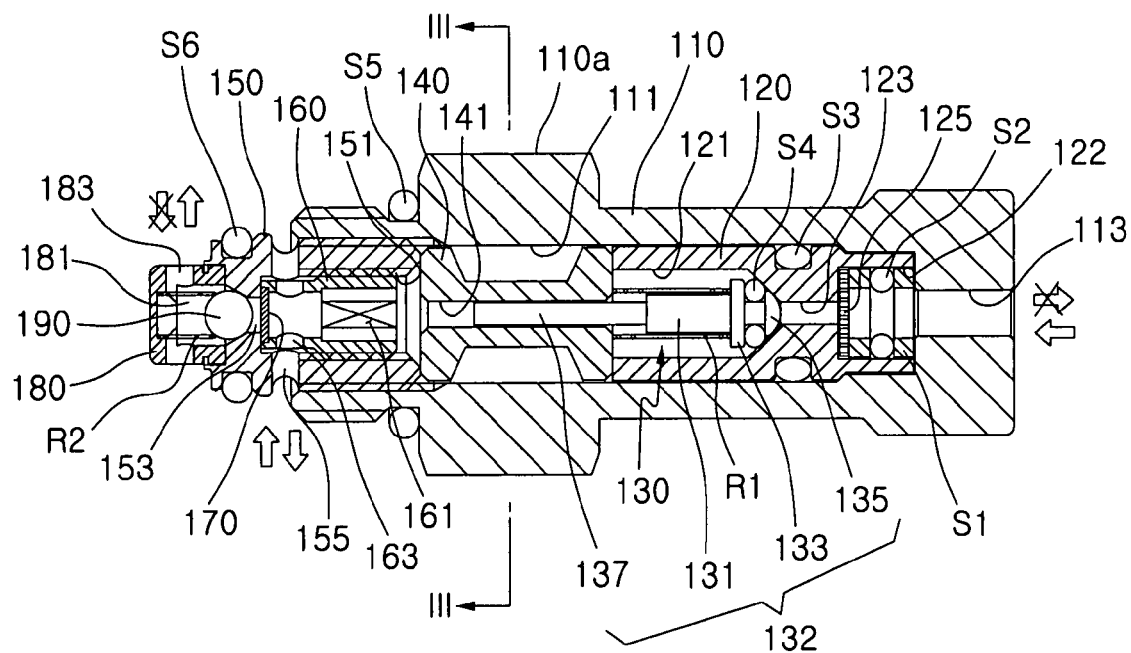
FIG. 2 is an enlarged cross-sectional view enlarging and illustrating a charge adapter illustrated in FIG. 1.

Referring to FIG. 2, the charge adapter 100 charges oxygen into the cylinder 2 from the post valve 10 through a separate oxygen generation apparatus (not shown), and includes an adapter body 110, a check valve guide unit 120, a first check valve 130, a stopper 140, a check plug 150, a filter support 160, a filter 170, a check valve support 180 and a second check valve 190.

The one side of the adapter body 110 is detachably screw-connected with an opening 12 of a valve body 11 of the post valve 10, and a hollow portion 111 into which the check valve guide unit 120 and the stopper 140 are inserted in sequence along the lengthy direction of the adapter body 110 is formed in the adapter body 110. In addition, an oxygen influx hole 113 with which a supply hose of an oxygen generation apparatus (not shown) is connected is formed at the other side of the adapter body 110. The oxygen influx hole 113 communicates with the hollow portion 111, and is simultaneously formed of a diameter smaller than that of the hollow portion 111.

Moreover, in order to make the adapter body 110 make the charge adapter 100 easily combined with and separated from the valve body 11 using a wrench (not shown), a wrench holder 110a which can hold a wrench is formed on the outer circumference of the adapter body 110.

The first and second grooves 121 and 122 which communicate with each other through the first communication hole 123 are formed at one side and other side of the check valve guide unit 120, respectively. Here, the first communication hole 123 is preferably made of a diameter smaller than those of the first and second grooves 121 and 122. The first groove 121 contacts the stopper 140 and the first check valves 130 is installed in the first groove 121, the second grooves 122 communicates with the oxygen influx hole of the adapter body 110, and a pair of a packing S1 and a seal ring S2 which is disposed therebetween are inserted into the second groove 122. Such a pair of a packing S1 and a seal ring S2 maintain air-tightness when oxygen is supplied since a supply hose (not shown) of an oxygen generation apparatus (not shown) is inserted into a pair of the packing S1 and the seal ring S2 through the oxygen influx hole 113. In this case, a pre-filter 125 is installed in the second groove 122 of the check valve guide unit 120, to thus interrupt impurities from flowing into the cylinder 2 in advance.

The first check valve 130 includes a check valve guide unit 120, an actuator 132 where a valve head 135, a flange unit 133, a body unit 131 and a guide rod 137 are integrally formed, a return spring R1 and a stopper 140.

The actuator 132 is elastically installed in the first groove 121 of the check valve guide unit 120 by the return spring R1. The actuator 132 makes the first communication hole 123 opened when oxygen is supplied through the first communication hole 123 of the check valve guide unit 120. Reversely, when oxygen is not supplied through the first communication hole 123 of the check valve guide unit 120, the actuator 132 makes the first communication hole 123 closed from the cylinder 2, to thus prevent oxygen from leaking through the first communication hole 123 from the cylinder 2. The actuator 132 includes the body unit 131 and the flange unit 133 in which one end of the return spring R1 is supported to one side of the body unit 131. The valve head 135 for opening and closing the first communication hole 123 is formed at one side of the flange unit 133, and the guide rod 137 is formed at the other side of the body unit 131. In this case, a seal ring S4 is connected between the flange unit 133 and the valve head 135.

Figure 3:
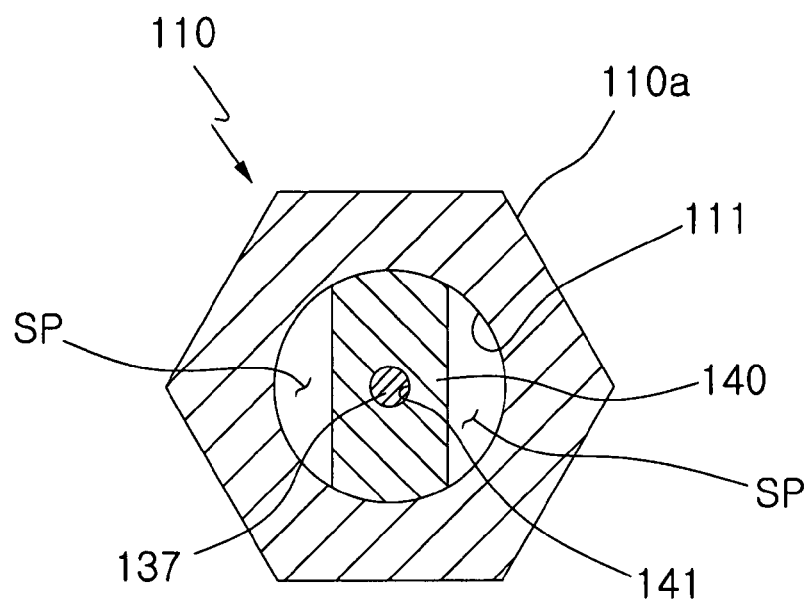
FIG. 3 is a cross-sectional view along a line III-III illustrated in FIG. 2.

The stopper 140 includes a guide hole 141 into which the guide rod 137 of the first check valve 130 is slidably inserted in the inside thereof. In this case, the guide hole 141 is arranged concentrically with respect to the center of the first communication hole 123 of the check valve guide unit 120, and thus the valve head 135 exactly closes the first communication hole 123 when the first check valve 130 is actuated. Also, it is desirable that the stopper 140 is formed of a shape which is not circular in cross-section, so as to form a predetermined space SP with respect to the inner circumferential surface of a space unit 111 when the stopper 140 is inserted into the space unit 111 of the adapter body 110, as shown in FIG. 3. This space SP is used as an influx path of the oxygen which passes through the first check valve 130.

The check plug 150 is detachably screw-connected with one side of the adapter body 110. The check plug 150 has a hollow portion 151 at one side thereof, and a second communication hole 153 which is opened and closed by the second check valve 190 at the other side thereof. In addition, the check plug 150 has a number of third communication holes 155 which are formed at predetermined intervals along the circumferential surface thereof and simultaneously communicate with the hollow portion 151. Here, the second communication hole 153 is used as a path of the oxygen which is discharged from the cylinder 2, and moves to the post valve 10, and the third communication holes 155 serve as a path which guides oxygen to be charged into the cylinder 2 and simultaneously serve as a path which discharges oxygen to the second communication hole 153 from the cylinder 2.

The filter support 160 is inserted into the hollow portion 151 of the check plugs 150, and has a hollow portion 161 therein and a number of communication holes 163 which communicate with the hollow portion 161 along the circumferential surface thereof. In this case, it is desirable that a number of the communication holes 163 are formed at positions corresponding to a number of the third communication holes 155 of the check plugs 150, respectively.

For example, a mesh-shaped filter or a sintering filter can be used for the filter 170. The filter 170 is inserted into the hollow portion 151 of the check plugs 150, and closely adhered to the second communication hole 153 by the filter support 160. Accordingly, impurities included in the oxygen discharged from the cylinder 2 to the post valve 10 can be filtered. Moreover, the filter 170 can be easily maintained and repaired including replacement of the filter 170 since the charge adapter 100 can be easily detached from or attached to the post valve 10.

In the above-described embodiment of the present invention, the filter 170 has been illustratively described using the filter support 160. However, since the filter 170 has an elastic force, a groove is provided in the hollow portion 151 of the check plugs 150 and then the filter 170 is pressed into and engaged with the groove, instead of using the filter support 160.

The check valve support 180 has a hollow portion 181 into which the second check valve 190 is movably inserted in the inside thereof, and is detachably combined with one side of the check plug 150. In this case, the check valve support 180 is located in an insertion space 14 formed on the valve body 11 of the post valve 10, when the charge adapter 100 is installed in the post valve 10. Here, the check valve support 180 communicates with the hollow portion 181, and simultaneously includes a number of fourth communication holes 183 which are formed along the circumferential surface thereof. A number of the fourth communication holes 183 play a role of a path of guiding oxygen passing through the second communication hole 153 of the check plug 150 to the CGA-870 port 13 of the post valves 10.

The second check valve 190 is formed of a spherical ball, and is elastically installed in the check valve support 180 by a return spring R2. The second check valve 190 opens the second communication hole 153 of the check plug 150 when oxygen is supplied from the cylinder 2 to the post valve 10. Reversely, when oxygen is charged into the cylinder 2 through the CGA-870 port 13 of the post valve 10, the second check valve 190 closes the second communication hole 153 of the check plug 150.

The oxygen influx hole 113, the first communication hole 123, the guide hole 141 and the space unit 111 that are respectively formed in the lengthy direction from the charge adapter 100 in sequence in the adapter body 110, the check valve guide 120, and the stopper 140 form the third path. The hollow portion 161, a number of the communication holes 163, a number of the third communication hole 155, the second communication hole 153, the hollow portion 181, and a number of the fourth communication hole 183 which are formed in the check plug 150, the check valve support 180 and the filter support 160, respectively form the fourth path.

The charge adapter 100 has the third path which is formed lengthily therein, and the fourth path whose one side communicates with the third path and whose other side communicates with the first path and the insertion space therein. The first check valve 132 is included in the third path and the second check valve 190 is included in the fourth path.

Reference characters S3, S4, S5 and S6 denote seal rings which are installed in order to keep air tightness between the respective parts in FIG. 2, respectively.

Referring to FIGS. 1 to 4, operation of the valve apparatus 1 will be described below if the valve apparatus according to the embodiment of the present invention is used for a post valve of an oxygen generation system for household use.

First of all, as shown in FIG. 1, the charge adapter 100 is combined with the opening 12 of the valve body 11, in order to prevent oxygen from leaking to the CGA-870 port 13 during charging oxygen at the state where the lever 16 of the post valve 10 is vertically erected and then the second path 15b of the valve body 11 is closed. Then, a supply hose or a charge nozzle (not shown) of an oxygen generation apparatus (not shown) is connected to the oxygen influx hole 113 of the charge adapter 100.

Next, the oxygen supplied from the charge nozzle (not shown) flows into the first communication hole 123 of the check valve guide unit 120, and the first communication hole 123 is opened while the first check valve 130 is pushed toward the stopper 140.

The supplied oxygen passes through the first communication hole 123 and flows into a space SP between the inner circumferential surface of the space unit 111 of the body and the stopper 140. Thereafter, the supplied oxygen passes through the communication hole 163 of the filter support 160 and the third communication hole 155 of the check plug 150 in sequence, and flows into the first path 15a.

Accordingly, the oxygen supplied from the oxygen generation apparatus (not shown) is charged into the cylinder 2 through the first path 15a.

Figure 4:
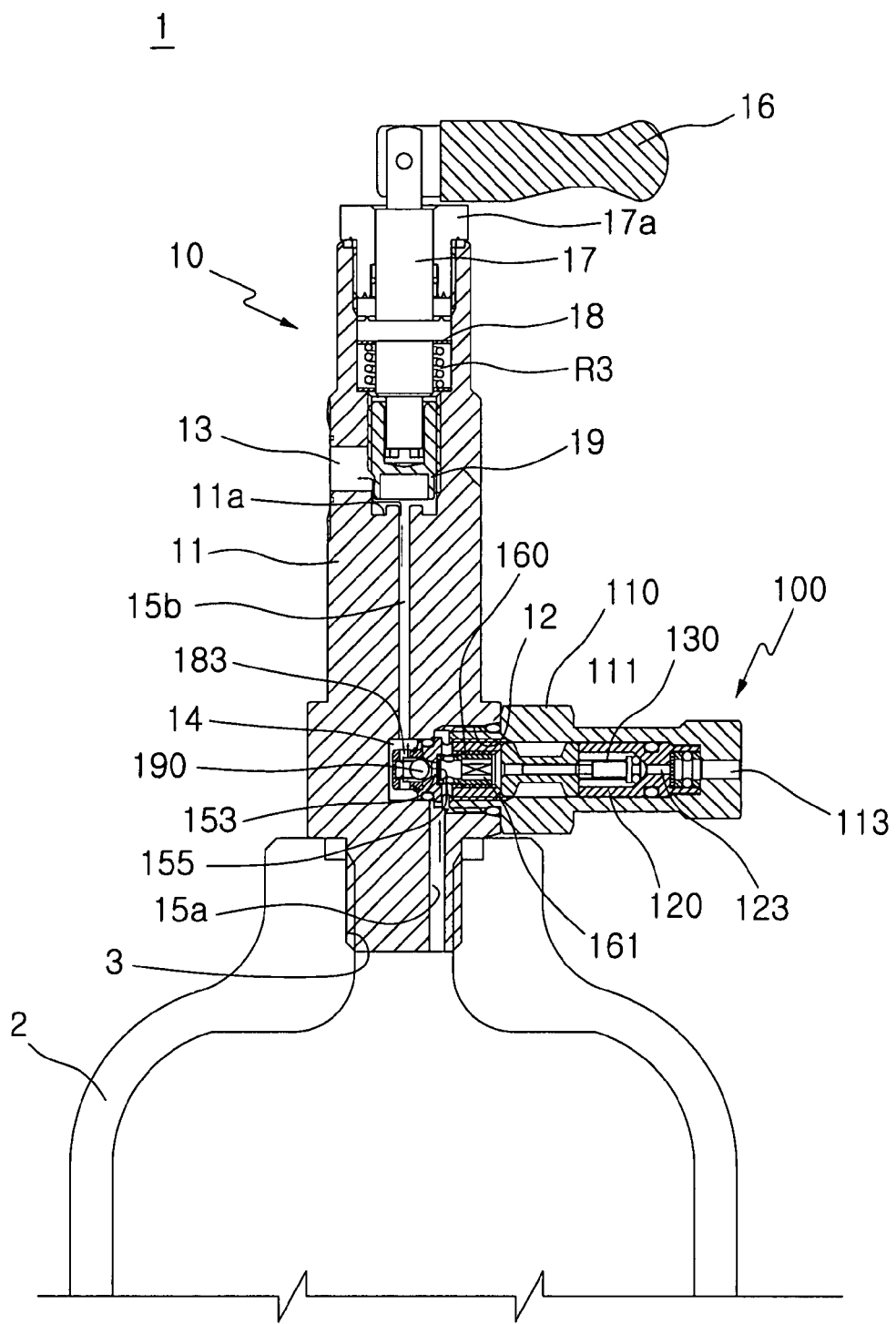
FIG. 4 is a cross-sectional view showing a state where a valve apparatus according to an embodiment of the present invention is used for a post valve, for an oxygen generation system for household use.

In the case that the oxygen charged in the cylinder 2 is supplied for patients after the oxygen has been completely charged into the cylinder 2, a connection hose (not shown) of an oxygen supply mask (not shown) is connected with the CGA-870 port 13. Thereafter, if the lever 16 is pivoted so as to be bent at right angles with respect to the valve body 11, as shown in FIG. 4, the piston rod that is elastically supported by the return spring R3 rises up and simultaneously the upper end of the second path 15b of the state closed by the valve stem 19 is opened.

Accordingly, the oxygen charged in the cylinder 2 is entered into the valve body 11 along the first path 15a, and then passes through the third communication hole 155 of the check plug 150 and the communication hole 163 of the filter support 160 in sequence. As a result, the oxygen flows into the hollow portion 161 of the filter support 160.

If the oxygen successively passes through the filter 170 to then be filtered and immediately proceed into the second communication hole 153 of the check plug 150, the second check valve 190 is pushed by pressure 190 to thus make the second communication hole 153 opened.

Thereafter, oxygen passes through the opened second communication hole 153 and moves along the second path 15b of the valve body 11 and then gets out of the second path 15b to then be supplied to patients by an oxygen supply mask (not shown) through the CGA-870 port 13.

Meanwhile, a user uses a valve apparatus according to the present invention as a post valve for an oxygen generation system for household use. In this case, although the user connects the oxygen generation system for household use with the CGA-870 port 13 on purpose or by mistake, in order to charge oxygen into an oxygen cylinder 2, the second check valve 190 is pushed to thus block the second communication hole 153 by pressure of the charged oxygen and to thereby close the second communication hole 153. Therefore, the valve apparatus of this invention fits the FDA regulation which requires that although an oxygen generation apparatus for household use would be connected with the CGA-870 port 13, oxygen should not be charged into the oxygen cylinder 2.

Figure 5:
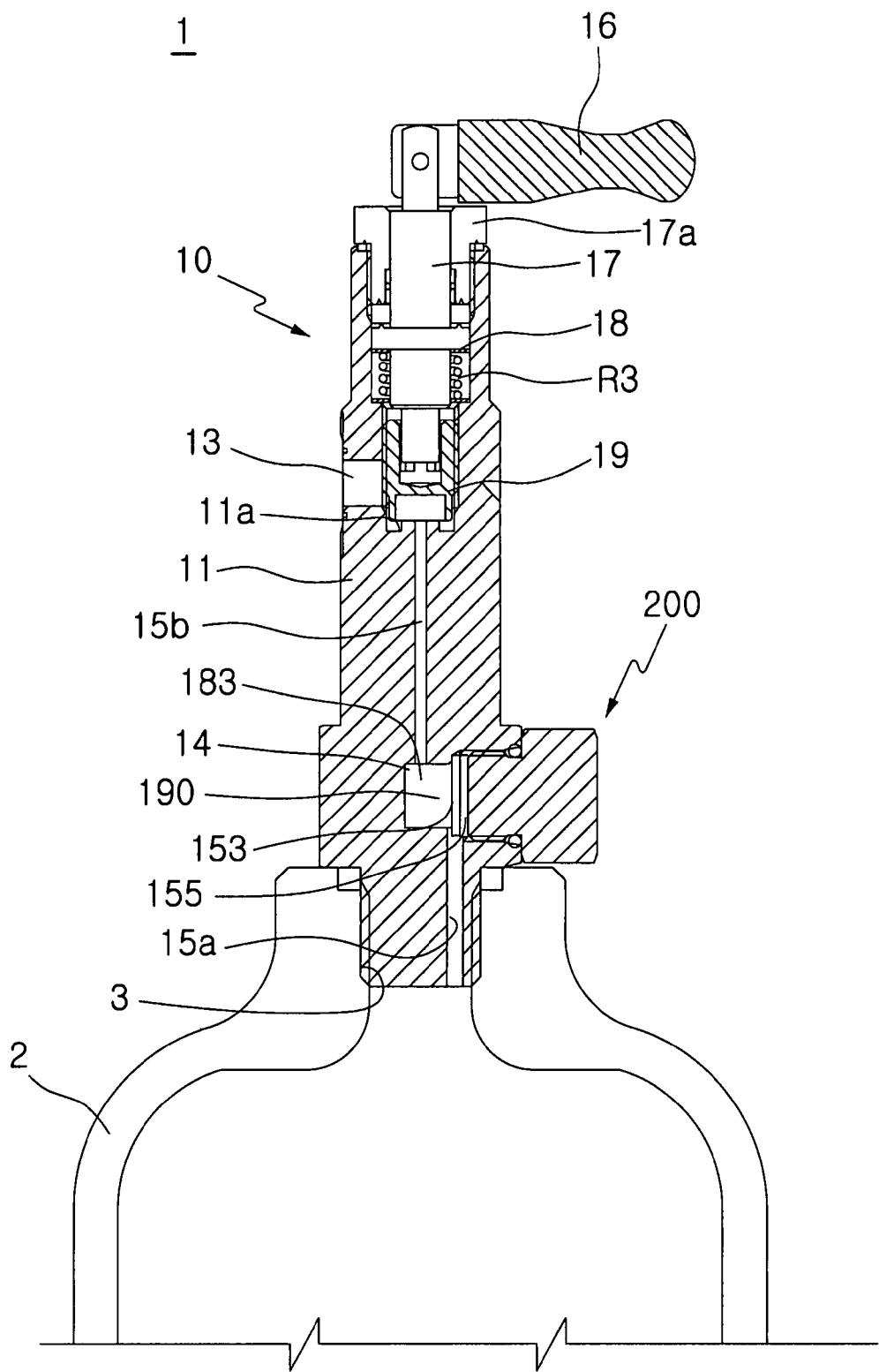
FIG. 5 is a cross-sectional view showing a state where a valve apparatus according to an embodiment of the present invention is used for a post valve for general medical care.

Meanwhile, referring to FIG. 5, the valve apparatus 1 according to the embodiment of the present invention can be used as a post valve for general medical care, in the case that a charge adapter 100 is removed from the valve body 11 and then the closing bolt 200 is combined with the opening of the valve body 11.

That is to say, in the case that the valve apparatus 1 according to the embodiment of the present invention is used as a post valve for general medical care, oxygen of high purity which is used for medical institutions such as hospitals can be charged into the oxygen cylinder 2 through the CGA-870 port 13, at the state where the upper end of the second path 15b which communicates from the oxygen cylinder 2 to the CGA-870 port 13, that is, the discharge port is opened, by pivoting the lever 16 of the post valve 10 so as to be bent at right angles with respect to the valve body 11, at an oxygen charge station as shown in FIG. 5. Thereafter, when oxygen has been completely charged, the lever 16 is pivoted so as to become a straight line with respect to the valve body 11 as shown in FIG. 1, to thus close the upper end of the second path 15b.

Then, the oxygen cylinder 2 supplied to a medical institution can be used to supply oxygen for patients, by bending the lever 16 of the post valve 10 at right angles with respect to the valve body 11 to thereby make the upper end of the second path 15b opened.

As described above, a valve apparatus 1 according to an embodiment of the present invention can be used selectively with a charge adapter 100 and a closing bolt 200. Thus, the valve apparatus 1 according to the embodiment of the present invention performs functions of both a post valve for an oxygen generation system for household use and a post valve for general medical care.

Moreover, when the second check valve 190 is repaired in the case of the valve apparatus 1 according to the embodiment of the present invention, the valve apparatus is not separated from the cylinder 2 to then decompose the valve apparatus as in the conventional art. Instead, since only the charge adapter 100 is separated from the valve body 11 at the state where the valve body 11 has been installed in the cylinder 2 to thus repair or replace the second check valve 190, the entire maintenance and repair can be performed quickly and easily in the present invention.

In addition, the valve apparatus 1 according to the embodiment of the present invention performs filtering of oxygen discharged from the cylinder 2 through the filter 170 to thus filter dust or other pollutants included in the oxygen and then supplies the filtered oxygen to the CGA-870 port 13, to thereby supply clean oxygen for patients.

The present invention is applied to a valve apparatus which is installed in a movable oxygen cylinder so as to serve as functions of a post valve for an oxygen generation system for household use and a post valve for general medical care at the same time, by selectively using a charge adapter and a closing bolt.

As described above, a valve apparatus according to the present invention selectively uses a charge adapter and a closing bolt, to thus provide an effect of serving as both a function of a post valve for an oxygen generation system for household use and a function of a post valve for general medical care.

In addition, in the case that a valve apparatus according to the present invention is used for a post valve for an oxygen generation system for household use, a check valve is provided in a charge adapter so as to satisfy a FDA regulation which requires that although an oxygen generation apparatus for household use would be installed in a CGA-870 port, oxygen should be prevented from being charged into an oxygen cylinder.

Further, in the case that a check valve is repaired and replaced in the present invention, a valve body is not separated from a cylinder but only a charge adapter is separated from the valve body, to thus repair and replace the check valve and to thereby maintain and repair the check valve easily and quickly.

Moreover, oxygen discharged from a cylinder is discharged through a filter in a check valve, to thus supply oxygen of high cleanliness for a patient.

The present invention is not limited to the above-described embodiment. It is apparent to one who has an ordinary skill in the art that there may be many modifications and variations within the same technical spirit of the invention.

What is claimed is:

1. A valve apparatus for a movable oxygen cylinder, the valve apparatus comprising:
    a valve body whose one side is combined with the movable oxygen cylinder, and which comprises an opening which communicates with a discharge port at the other side therein along a first path, an insertion space, and a second path, in sequence lengthily from one side, to thus discharge oxygen discharged from the oxygen cylinder through the discharge port, and which is opened outside from the insertion space provided between the first path and the second path;
    a post valve which is installed at an other side of the valve body, and which opens and closes an upper end of the second path which communicates from the oxygen cylinder to the discharge port according to operation of a lever, to thus control discharge of oxygen; and
    a charge adapter whose one side is detachably installed in the opening of the insertion space, and which comprises a third path which is formed lengthily and a fourth path whose one side communicates with the third path and other side communicates with the first path and the insertion space, and a first check valve which charges oxygen supplied from the outside into the oxygen cylinder along the third path, the fourth path and the first path, in the case that the check valve is installed along the third path and thus closes the second path, and a second check valve which discharges oxygen supplied from the oxygen cylinder into the discharge port along the first path, the fourth path, the insertion space and the second path, in the case that the check valve is installed along the fourth path and thus opens the second path, wherein the first check valve interrupts oxygen discharged from the oxygen cylinder from reversely flowing in the charging direction of the charge adapter, and the second check valve interrupts oxygen from being charged into the oxygen cylinder through the discharge port.

2. The valve apparatus according to claim 1, wherein the charge adapter comprises:

an adapter body whose rear end is detachably combined with the entrance of the insertion space of the valve body, and with a front end of which an oxygen generation apparatus is selectively combined, and which has a hollow portion which communicates with an oxygen influx hole lengthily therein;

the first check valve which is installed in the hollow portion of the adapter body, in which a first communication hole which communicates with the oxygen influx hole is provided in the third path, and which makes the first communication hole opened, and interrupts the oxygen discharged from the oxygen cylinder from reversely flowing in the charging direction of the charge adapter, when the oxygen supplied from the outside is charged into the oxygen cylinder;

a check plug whose one side is combined with the hollow portion of the adapter body, in which a second communication hole is provided in the fourth path which communicates with the third path, and which has at least one third communication hole which communicates with the first path from the fourth path and at least one fourth communication hole which communicates with the second path through the insertion space from the fourth path; and the second check valve which is installed in the fourth path of the check plug, and which makes the second communication hole opened, and interrupts the oxygen from being charged into the oxygen cylinder through the discharge port of the valve body, when the oxygen of the oxygen cylinder is discharged through the discharge port.

3. The valve apparatus according to claim 2, further comprising a filter which is installed in the fourth path, and which filters impurities included in the oxygen which is guided into the second path of the valve body through the second communication hole from the oxygen cylinder.

4. The valve apparatus according to claim 2, further comprising a pre-filter for filtering the impurities which flow into the first communication hole through the oxygen influx hole when the oxygen is charged.

5. The valve apparatus according to claim 2, wherein the first check valve comprises:

a check valve guide unit which is installed in the hollow portion of the adapter body, in which first and second grooves which communicate with each other through the first communication hole are formed in the inner circumferential portion of the third path which communicates with the oxygen influx hole;

a stopper which is installed adjacently at the rear end of the check valve guide unit which is installed in the hollow portion of the adapter body, and which has a guide hole which is disposed concentrically with the center of the first communication hole of the check valve guide unit therein; and an actuator in which a valve head, a flange unit, a body unit and a guide rod are integrally formed in sequence, and which is installed elastically in the first groove, and in which the valve head selectively contacts the first communication hole and the guide rod is slid along the guide hole of the stopper, so as to make the first communication hole opened and to interrupt the oxygen discharged from the oxygen cylinder from reversely flowing in the charging direction of the charge adapter, when oxygen is charged into the oxygen cylinder.

6. The valve apparatus according to claim 2, wherein the second check valve is formed of a spherical ball which is elastically installed so as to selectively open and close the second communication hole which is provided in the fourth path of the check plug according to whether or not oxygen is discharged.

7. The valve apparatus according to claim 1, wherein the discharge port supplies oxygen for a patient.

8. A valve apparatus for a movable oxygen cylinder, the valve apparatus comprising:

a valve body whose one end is detachably combined with the movable oxygen cylinder, and which comprises a first path which is formed lengthily therein and whose one side communicates with the oxygen cylinder, a second path which is formed lengthily therein and whose one side communicates with a discharge port, and an insertion space whose one side communicates with an opening which is opened outside and whose other side communicates with the other sides of the first and second paths, respectively;

a post valve which is installed at the other end of the valve body, and which opens and closes the upper end of the second path which communicates from the oxygen cylinder to the discharge port according to operation of a lever, to thus control discharge of oxygen; and a charge adapter whose one side is detachably installed in the opening of the insertion space, and which comprises a first check valve which charges oxygen supplied from the outside into the oxygen cylinder in the case that the post valve closes the second path and a second check valve which discharges oxygen supplied from the oxygen cylinder into the discharge port in the case that the post valve opens the second path, wherein the first check valve interrupts oxygen discharged from the oxygen cylinder from reversely flowing in the charging direction of the charge adapter, and the second check valve interrupts oxygen from being charged into the oxygen cylinder through the discharge port.

9. The valve apparatus according to claim 8, wherein the charge adapter comprises:

an adapter body whose rear end is detachably combined with the entrance of the insertion space of the valve body, and with the front end of which an oxygen generation apparatus is selectively combined, and which has a third path which communicates with an oxygen influx hole lengthily therein;

the first check valve which is installed in the third path inside the adapter body, and which makes the third communication hole opened, and interrupts the oxygen discharged from the oxygen cylinder from reversely flowing in the charging direction of the charge adapter, when the oxygen supplied from the outside is charged into the oxygen cylinder;

a check plug which is installed at the rear end of the first check valve inside the adapter body, and which has a fourth path whose one side communicates with the third path and whose other side communicates with the first path and the insertion space therein; and the second check valve which is installed in the fourth path of the check plug, and which makes the fourth path opened, and interrupts the oxygen from being charged into the oxygen cylinder through the discharge port, when the oxygen of the oxygen cylinder is discharged through the discharge port.

10. The valve apparatus according to claim 9, wherein the first and second paths are disposed on a respectively different axial line, in which the first path mutually communicates with the second path through the fourth path, the second check valves and insertion space installed in the check plug.

11. The valve apparatus according to claim 8, wherein the discharge port supplies oxygen for a patient.

* * * * *